United States Patent [19]

Kikuchi et al.

[11] Patent Number: 4,679,091
[45] Date of Patent: Jul. 7, 1987

[54] MULTIPLE SCANNING TYPE TELEVISION RECEIVER

[75] Inventors: Masafumi Kikuchi; Toshio Onodera; Sumio Toyama, all of Kanagawa; Hiroshi Sakamoto, Tokyo, all of Japan

[73] Assignee: Sony Corporation, Tokyo, Japan

[21] Appl. No.: 786,249

[22] Filed: Oct. 10, 1985

[30] Foreign Application Priority Data

Oct. 15, 1984 [JP] Japan .................. 59-215856

[51] Int. Cl.$^4$ .............................. H04N 5/68
[52] U.S. Cl. ................... 358/242; 358/188; 358/148; 358/158
[58] Field of Search ............... 358/180, 140, 148, 150, 358/242, 181, 188, 158; 328/187

[56] References Cited

U.S. PATENT DOCUMENTS 3,182,124 5/1965 Nurse .................. 358/140 X
4,238,274 12/1980 Lehman .................. 358/242

Primary Examiner—James J. Groody
Assistant Examiner—Victor R. Kostak
Attorney, Agent, or Firm—Hill, Van Santen, Steadman & Simpson

[57] ABSTRACT

A television receiver having a video signal receiving circuit for receiving a video signal, a vertical synchronizing signal and a horizontal synchronizing signal, a signal processing circuit for supplying the video signal to a cathode ray tube, a vertical deflection circuit for supplying a vertical deflection signal to the cathode ray tube in response to the vertical synchronizing signal, a horizontal deflection circuit for supplying a horizontal deflection signal to the cathode ray tube in response to the horizontal synchronizing signal, a frequency detector circuit connected to the video signal receiving circuit for detecting the frequency of the horizontal synchronizing signal and deriving a control signal in response thereto and a control circuit connected between the frequency detector circuit and the horizontal deflection circuit for controlling the latter in response to the control signal from the former. In this case, the horizontal deflection circuit includes a circuit for changing the duty cycle of a horizontal drive pulse such that the duty cycle increases when the horizontal frequency becomes higher.

10 Claims, 40 Drawing Figures

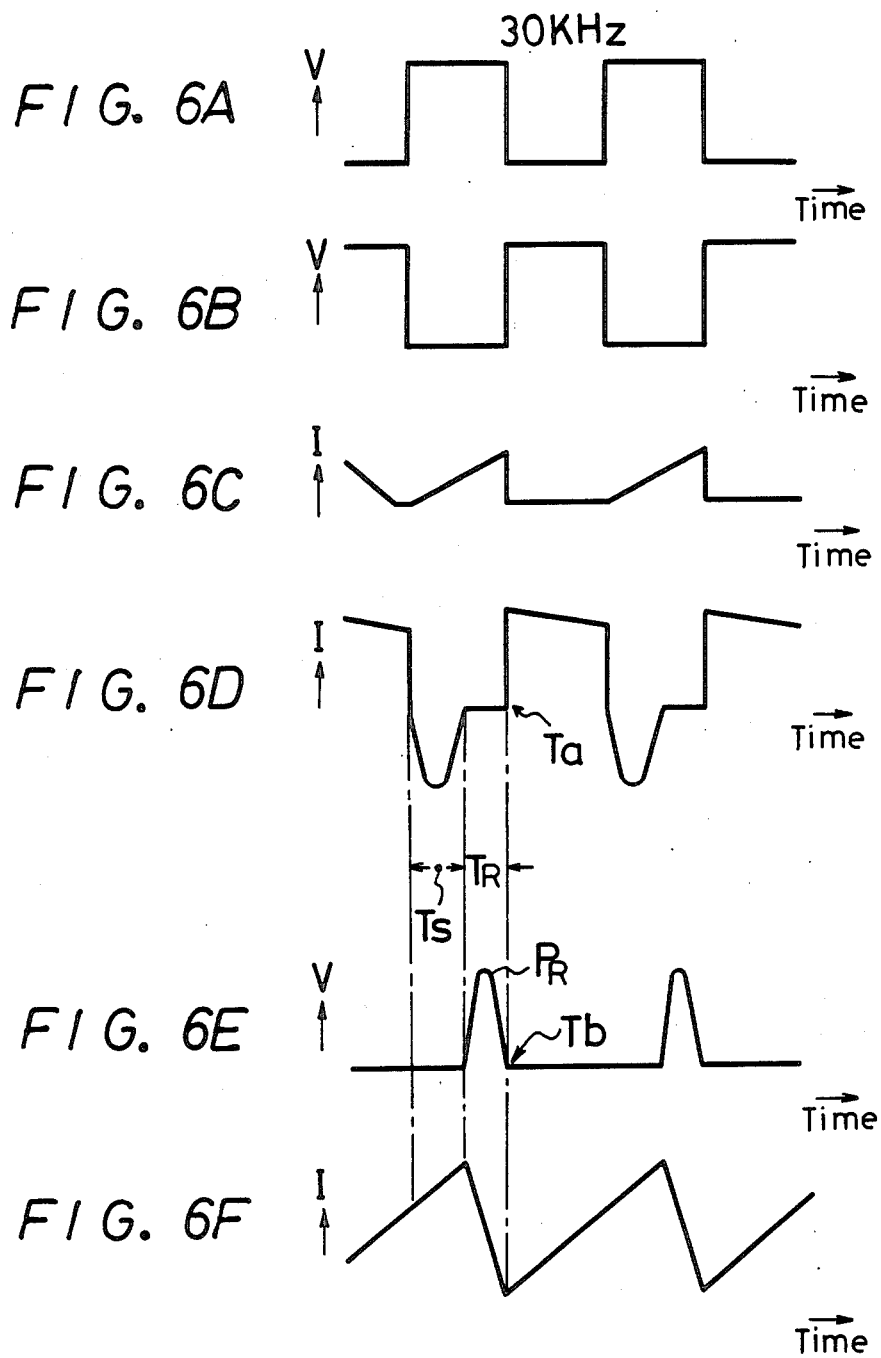

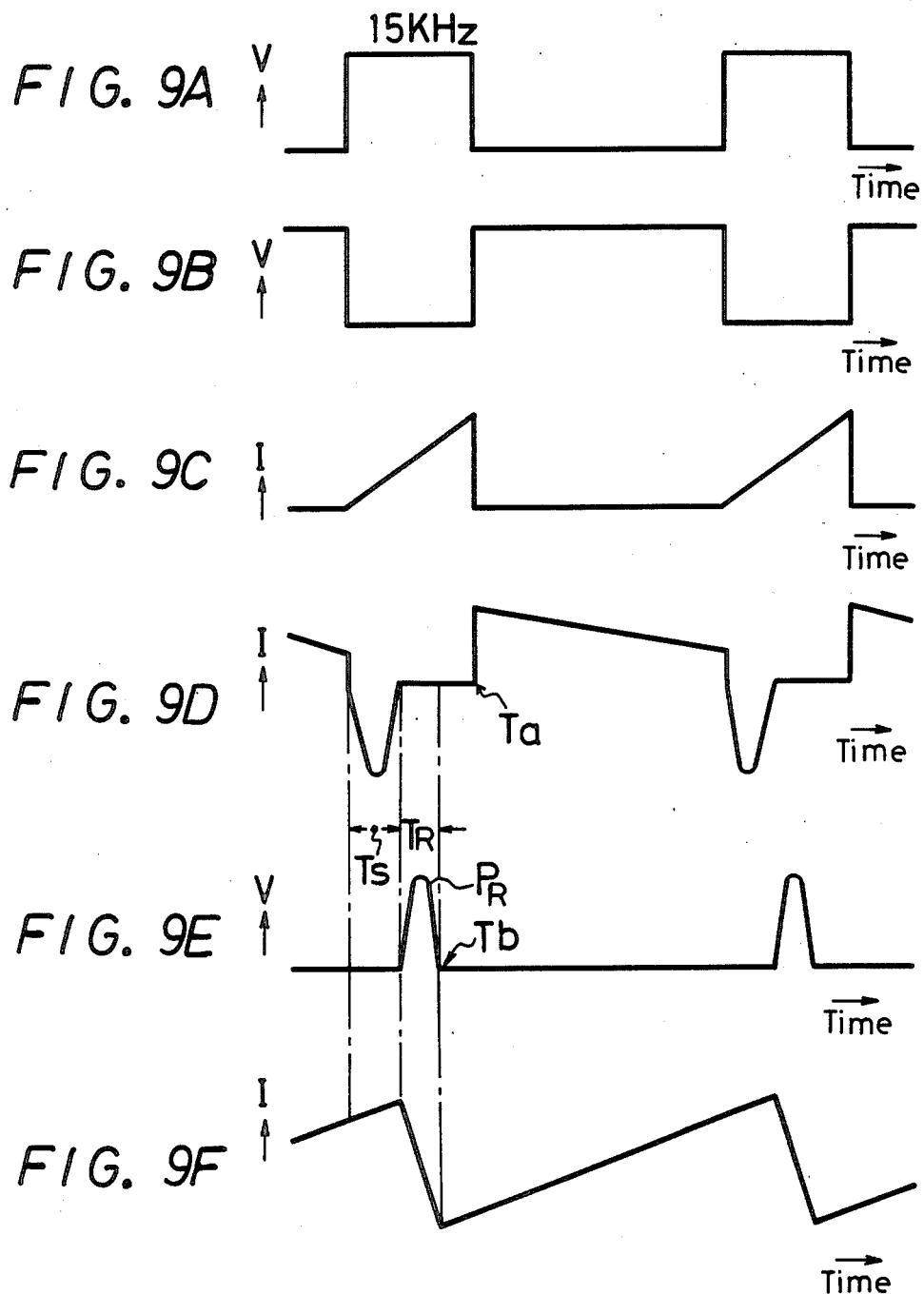

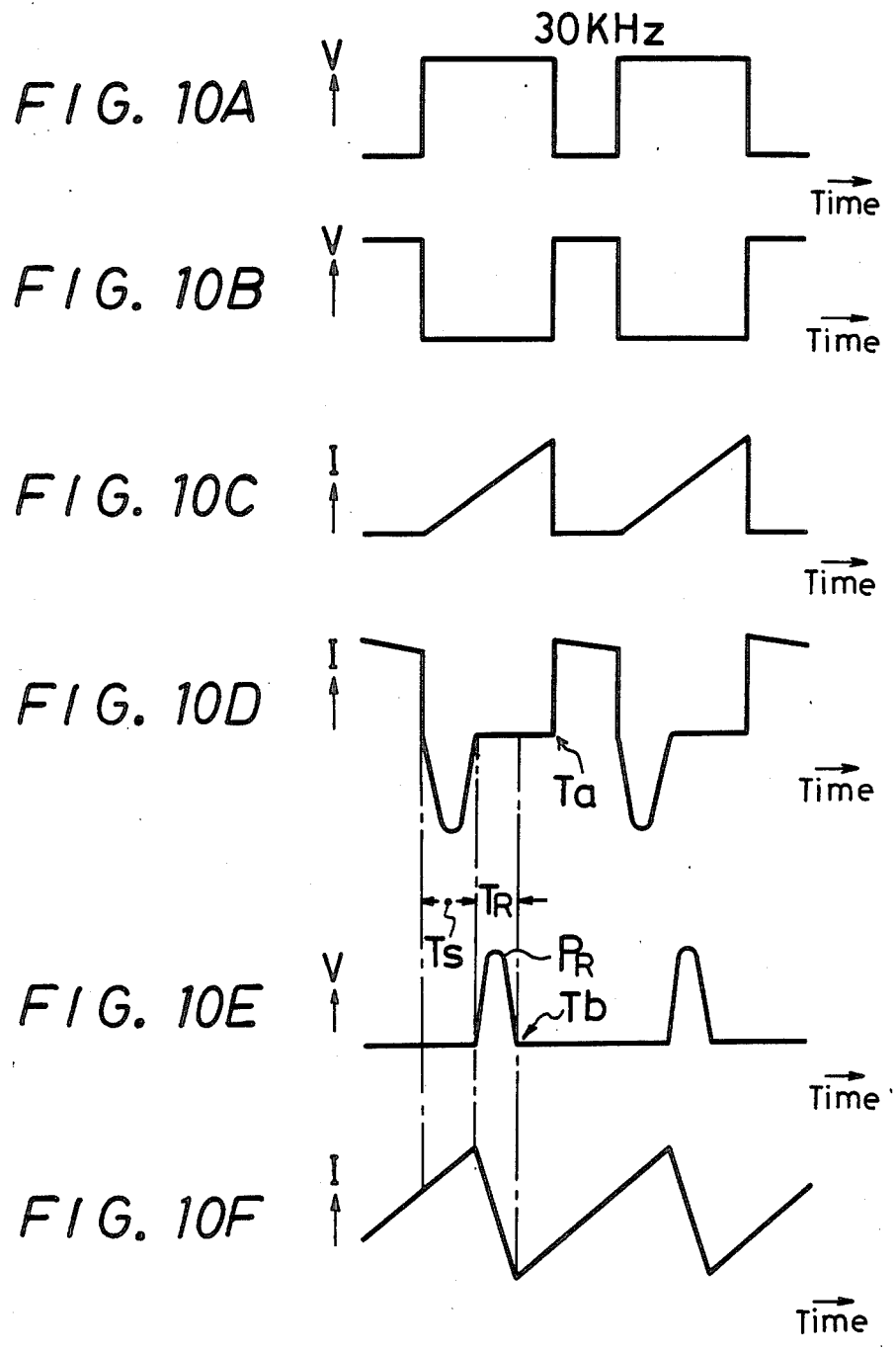

MULTIPLE SCANNING TYPE TELEVISION RECEIVER

BACKGROUND OF THE INVENTION

1. Field of the Invention

This invention generally relates to television receivers and, more particularly is directed to a multiple scanning type television receiver which is designed to be able to receive video signals having different line frequencies from a scanning converter and so on for doubling a line frequency in addition to the reception of the standard television broadcasting.

2. Description of the Prior Art

For example, in a television signal according to NTSC system, a video signal is composed of a vertical frequency of about 60 Hz and a horizontal line frequency of about 15.75 KHz. While, a scanning converter is proposed, which improves a reproduced picture quality by doubling the number of horizontal lines by means of calculating operation and so on. When this scanning converter is used, the video signal derived therefrom has a vertical frequency of around 60 Hz while a horizontal frequency of about 31.5 KHz.

Some computers of so-called high resolution display are designed to produce a video signal having a line frequency of about 24 KHz. Further, a so-called high definition television(HDTV) system is intended to employ a line frequency of about 33.75 KHz.

At present, a multiple scanning type television receiver has been proposed, which can commonly receive various video signals having different line frequencies with a single receiver.

An example of a multiple scanning type television receiver previously proposed by the assignee same as that of this application will be described with reference to FIGS. 1 to 6. FIG. 1 is a block diagram showing an overall of such multiple scanning type television receiver. Referring to FIG. 1, when receiving a standard video signal from a tuner for the standard television broadcasting, a video tape recorder, a video disc player, a tuner for the satellite broadcasting or some personal computers, etc., a video signal applied to an input terminal 1 is supplied through a video processing circuit 2 to an RGB processing circuit 3 and thereby three primary color signals R, G and B are formed. A video/RGB switching signal applied to another input terminal 4 is supplied to the RGB processing circuit 3 by which the video signal or RGB signals are selected and the three primary color signals are supplied through a video output circuit 5 to a cathode ray tube 6.

The video signal from the input terminal 1 is supplied to a sync. separator circuit 7 in which vertical and horizontal synchronizing signals are separated. The switching signal from the input terminal 4 is supplied to the sync. separator circuit 7 and the vertical synchronizing signal selected thereby from the video signal or RGB signals is supplied to a vertical deflection circuit 8. The vertical deflection signal from the vertical deflection circuit 8 is supplied to a vertical deflection yoke 9 of the cathode ray tube 6. The horizontal synchronizing signal derived from the sync. separator circuit 7 is supplied to an AFC(automatic frequency control) circuit 10 and to a mode detector circuit 11. The signal from the AFC circuit 10 is supplied to a horizontal oscillator circuit 12 and a normal control signal from the mode detector circuit 11 is supplied to the horizontal oscillator circuit 12. Then, the signal from the horizontal oscillator circuit 12 is supplied to a horizontal deflection circuit 13 and thereby a horizontal or line deflection signal derived from the horizontal deflection circuit 13 is supplied to a horizontal deflection yoke 14 of the cathode ray tube 6. The signal from the horizontal deflection circuit 13 is supplied to a high voltage generator circuit 15 which includes a flyback transformer(not shown). The high voltage produced in the high voltage generator circuit 15 is supplied to a high voltage terminal 16 of the cathode ray tube 6 and the flyback pulse therefrom is supplied to the AFC circuit 10.

A commercially available power from power supply terminals 17 is supplied to a power supply circuit 18 and the normal power supply voltage corresponding to the normal control signal from the mode detector circuit 11 is supplied from the power supply circuit 18 to the horizontal deflection circuit 13. The commercially available power from the power supply terminals 17 is supplied to another power supply circuit 19 and a stabilized power supply voltage therefrom is fed to other utilization circuits (not shown).

Thus, the standard or normal video signal is received and reproduced. Further, the previously proposed multiple scanning type television receiver can receive digital or analog primary color output signals of R, G and B(hereinafter simply RGB signals) from some high grade personal computers, so-called "CAPTAIN" (Character And Pattern Telephone Access Information Network) decoders, teletext decoders or scanning converters, etc. In this case, digital RGB signals are supplied to input terminals 20R, 20G and 20B and analog RGB signals are supplied to input terminals 21R, 21G and 21B, respectively. Then, one of them is selected by a switch 22 and then fed to the RGB processing circuit 3, in which the RGB signals are selected by the video/RGB switching signal from the input terminal 4 and fed to the video output circuit 5.

A digital synchronizing signal from an input terminal 20S and an analog synchronizing signal from an input terminal 21S are selected by a switch 23 and then fed to the sync. separator circuit 7, in which the selected signal is further selected by the switching signal from the input terminal 4 and fed to the vertical deflection circuit 8 and to the AFC circuit 10. The signal from the sync. separator circuit 7 is supplied to the mode detector circuit 11 in which the control signal having a voltage value proportional to the detected frequency is formed, and the control signal is supplied to the horizontal oscillator circuit 12, the horizontal deflection circuit 13 and to the power supply circuit 18, respectively.

Thus, the digital or analog RGB signals are received and reproduced on the cathode ray tube 6. Further, when a so-called superimposed reception in which the normal video signal and the RGB signals are mixed and then displayed is carried out, the switching signal applied to the input terminal 4 is made as an RGB mode signal. Also, a position control signal Ys for the superimposed picture and an area control signal Ym for the superimposed picture applied to an input terminal 24 are supplied to the RGB processing circuit 3, in which the video signal and the RGB signals are selectively switched by these signals Ys and Ym.

As described above, various video signals are received and reproduced. In the above television receiver, the horizontal deflection section is practically formed as follows. Referring to FIG. 2, the horizontal synchronizing signal from the sync. separator circuit 7 is supplied through a horizontal synchronizing signal input terminal 7H to a frequency-to-voltage converter(FVC) 31 which forms the mode detector circuit 11 and thereby a control voltage in proportion to the horizontal frequency is formed. The output voltage from the FVC 31 is supplied to one fixed terminal 32b of a switching circuit 32 and the other fixed terminal 32c of the switching circuit 32 is grounded via a reference voltage source 33. In this case, the voltage value of the reference voltage source 33 is set to be equal to the value of a voltage that the FVC 31 produces when the horizontal synchronizing signal having a line frequency of about 15.75KHz according to the NTSC system is supplied to the input terminal of the FVC 31. The switching circuit 32 is supplied at its control terminal with the video/RGB switching signal from the above-mentioned input terminal 4 through an input terminal 4a. Then, when the video/RGB switching signal is the video side switching signal, the movable contact arm 32a of the switching circuit 32 is connected to one fixed terminal 32c, while when the video/RGB switching signal is the RGB side signal, the movable contact arm 32a of the switching circuit 32 is connected to the other fixed terminal 32b. The voltage obtained at the movable contact arm 32a of the switching circuit 32 is supplied through a buffer amplifier 34 to a voltage controlled oscillator(VCO) 35 which forms a part of the horizontal oscillator circuit 12. The oscillating output from the VCO 35 is supplied through a drive circuit 36 to a switching transistor 37 which forms the horizontal deflection circuit 13.

The voltage obtained at the movable contact arm 32a of the switching circuit 32 is supplied through a control amplifier 38 to, for example, a Y-Z parametric type power supply circuit 39 which forms the power supply circuit 18. The output voltage from this power supply circuit 39 is fedback to the control amplifier 38 via a voltage divider 40 and thereby the output voltage is stabilized. This stabilized output voltage is supplied to the primary coil of a flyback transformer 41.

The switching transistor 37 is connected in series to the primary coil of the flyback transformer 41. A damper diode 42, a resonant condenser 43 and a series circuit formed of the horizontal yoke 14 and an S-shaping condenser (capacitor) 44 are respectively connected in parallel to the switching transistor 37.

The horizontal synchronizing signal is supplied to a detector circuit 45 which forms the AFC circuit 10 and the signal from a voltage divider 46 connected in parallel to the switching transistor 37 is supplied to the detector circuit 45 and thereby an AFC control signal is obtained therefrom. This AFC control signal is supplied through a low pass filter(LPF) 47 to the control terminal of the VCO 35.

Condensers (capacitors) 49 and 50 are connected in parallel to the resonant condenser 43 via a switching circuit 48, respectively. Condensers 52 and 53 are connected in parallel to the S-shaping condenser 44 via a switching circuit 51, respectively. The voltage from the FVC 31 is supplied to a comparator circuit 54 which produces a 3 value-output signal indicative of which one of the three frequency ranges of lower than 20 KHz, 20 to 30 KHz and higher than 30 KHz the frequency of the horizontal synchronizing signal belongs to. In response to the compared output from the comparator circuit 54, the switching circuits 48 and 51 are controlled such that both of two switches incorporated therein are turned off or either of them is turned on.

Accordingly, in this horizontal deflection section, the VCO 35 produces the oscillating signal having the frequency changing in a range from 15 to 34 KHz in synchronism with the input horizontal synchronizing signal thereby to carry out the horizontal deflection, while the power supply circuit 39 generates the voltage changing in a range from 58 to 123 Volts in proportion to the line frequency and thereby the amplitude of the horizontal deflection signal is made constant regardless of its frequency. The condensers 49, 50 and 52, 53 connected in parallel to the resonant condenser 43 and the S-shaping condenser 44 are selectively switched and according to the input horizontal frequency, correction of the characteristic is performed.

Further in the television receiver shown in FIG. 1, the vertical deflection section is practically constructed as follows. As shown in FIG. 3, the vertical synchronizing signal from the sync. separator circuit 7 is supplied through an input terminal 7V to a sawtooth wave oscillator 61 which forms a part of the vertical deflection circuit 8, by which a condenser 62, for example, is charged and discharged by the current from a current source 63 to form a vertical sawtooth wave. This sawtooth wave is supplied to a comparator circuit 64 which produces a 3 value-output signal which indicates a predetermined voltage region, a voltage region lower than the predetermined voltage and a voltage region higher than the predetermined voltage. This compared output is supplied to a control terminal of an up/down counter (U.D.C.) 65. The U.D.C. is supplied at its counting terminal with the vertical synchronizing signal. The counted value from the U.D.C. 65 is supplied to a D/A (digital-to-analog) converter (hereinafter simply D.A.C.) 66 and the current source 63 is controlled by the converted analog value from the D.A.C.

As a result, the sawtooth wave generator 61 generates, regardless of the frequency of the vertical synchronizing signal, a sawtooth wave the height of the wave (the amplitude) of which is controlled to fall in a predetermined voltage region. This sawtooth wave is supplied through a vertical output circuit 67 to the vertical deflection yoke 9. A series circuit formed of a condenser 68 and a resistor 69 is connected in series to the vertical deflection yoke 9 and a voltage divider 70 is connected in parallel to the resistor 69. The divided output from the voltage divider 70 is fedback to the vertical output circuit 67.

Thus, the amplitude of the vertical deflection signal is made constant regardless of its frequency. If one resistor, which forms a part of the voltage divider 70, is made variable, it is possible to control the amplitude of the vertical deflection signal to become a desired one.

Another set (formed of oscillator 71 to D.A.C. 76) of the circuit formed the same as the sawtooth wave oscillator 61 to D.A.C 66 is provided. The output value of the D.A.C 76 in this circuit is supplied to a pincushion correction signal forming circuit 77 and a vertical parabolic signal obtained at, for example, the connection point between the deflection yoke 9 and the condenser 68 is supplied to the pincushion correcting signal forming circuit 77 which forms a pincushion correction signal. The pincushion correction signal is delivered to a pin cushion correction circuit (not shown).

In the above mentioned television receiver, the necessary horizontal and/or vertical deflections are carried out in response to various horizontal and/or vertical frequencies and various video signals having different deflection frequencies are received and reproduced.

In the horizontal drive circuit 36 of such multiple scanning type television receiver, as shown in the extracted form of FIG. 4, a horizontal drive transistor 36a is driven by the oscillating signal(hereinafter called as the horizontal drive pulse) from the VCO 35, a horizontal drive transformer 36b is driven by the horizontal drive transistor 36a and an output switching transistor 37 of the horizontal deflection circuit 13 is driven by the secondary side of the horizontal transformer 36b.

On the other hand, in the standard or normal television receiver, it is designated such that the duty cycle of the oscillating signal from the VCO 35 is selected to be about 50% and the voltage +Vcc obtained at a power supply terminal 36c and the winding ratio of the horizontal drive transformer 36b, etc. are selected to operate the switching transistor 37 at an optimum driving condition.

If the duty cycle of the horizontal drive pulse of the VCO 35 is selected to be about 50%, no trouble occurs when the line frequency is fixed at about 15.75 KHz as in the normal television receiver. However, it was found out by us that some troubles such as misoperation may occur in the multiple scanning type television receiver as shown in FIGS. 1 to 4 which is supplied with the video signal having a horizontal or line frequency which may change to more than double of the standard frequency.

Referring to FIGS. 4 to 6, an explanation will be given on a case in which video signals having the line frequencies of 15 KHz and 30 KHz are received and reproduced under the condition that the duty cycle of the horizontal drive pulse from the VCO 35 is fixed at 50%.

When the line frequency is 15 KHz, a horizontal drive pulse as shown in FIG. 5A is supplied from the VCO 35 to the base of the horizontal drive transistor 36a and thereby the collector voltage and current of the horizontal drive transistor 36a become as shown in FIGS. 5B and 5C, respectively. Then, the base current of the output switching transistor 37 becomes as shown in FIG. 5D and the collector voltage of the output switching transistor 37 becomes as shown in FIG. 5E so that a deflection current such as shown in FIG. 5F flows through the horizontal deflection yoke 14.

In like manner, when the line frequency is 30 KHz, the voltage and current waveforms at the respective portions or corresponding to FIGS. 5A to 5F become as shown in FIGS. 6A to 6F, respectively. That is, since the peak-to-peak value of the deflection currents (shown in FIGS. 5F and 6F) flowing through the horizontal deflection yoke 14 has to be kept constant regardless of the change of the horizontal or line frequency, a storage time $T_S$ of the base current of the output switching transistor 37 and a retrace time $T_R$ of its collector voltage have to be kept constant, respectively (in FIGS. 5 and 6, the storage time of the output switching transistor 37 is constant and the storage time of the horizontal drive transistor 36b is zero for simplicity of description). For this reason, there may be a fear that when the line frequency becomes relatively high as shown in FIG. 6, a time point Ta (shown in FIG. 6D)at which the base current of the output switching transistor 37 begins to flow comes closer to an end time point Tb of a retrace pulse $P_R$ such as shown in FIG. 6E and dependent on the case, the base current will flow through the base of the output switching transistor 37.

OBJECTS AND SUMMARY OF THE INVENTION

Accordingly, it is an object of this invention to provide a multiple scanning type television receiver having a horizontal deflection circuit which can operate properly for the input horizontal or line frequencies of a relatively wide range.

It is another object of this invention to provide a multiple scanning type television receiver which can, in addition to the reception of standard television broadcasting, receive and reproduce video signals having different line frequencies produced from a scanning converter for doubling the line frequency and so on.

According to one aspect of the present invention, there is provided a multiple scanning type television receiver in which a line frequency of an input video signal is detected, converted to a control voltage, this control voltage is applied to a horizontal deflection circuit to switch the line frequency of the horizontal deflection circuit whereby input video signals having different line frequencies are received and reproduced. Particularly, in this multiple scanning type television receiver, the duty cycle of a horizontal drive pulse for the horizontal deflection circuit is changed in response to the line frequencies of input video signals.

According to the circuit arrangement as mentioned above, the duty cycle of the horizontal drive pulse is designed to be varied in response to the input line or horizontal frequency such that the duration of the time period in which the horizontal drive transistor is turned on by the horizontal drive pulse may become longer than a sum of the storage time and the retrace time. Thus it is possible to avoid troubles such as misoperation in which a base current flows through the base of the switching transistor during the retrace time period.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIGS. 5A–5F and 6A–6F are waveform diagrams respectively to be used for explaining the operation of FIG. 1;

FIGS. 8A–8D to 10A–10F are waveform diagrams respectively to be used for explaining the operation of FIG. 7;

DESCRIPTION OF THE PREFERRED EMBODIMENTS

Now, an embodiment of a multiple scanning type television receiver according to this invention will hereinafter be described with reference to FIGS. 7 to 10. Throughout FIGS. 7 to 10, like parts corresponding to those of FIGS. 1 to 6 are marked with the same references and will not be described in detail.

Figure 1:
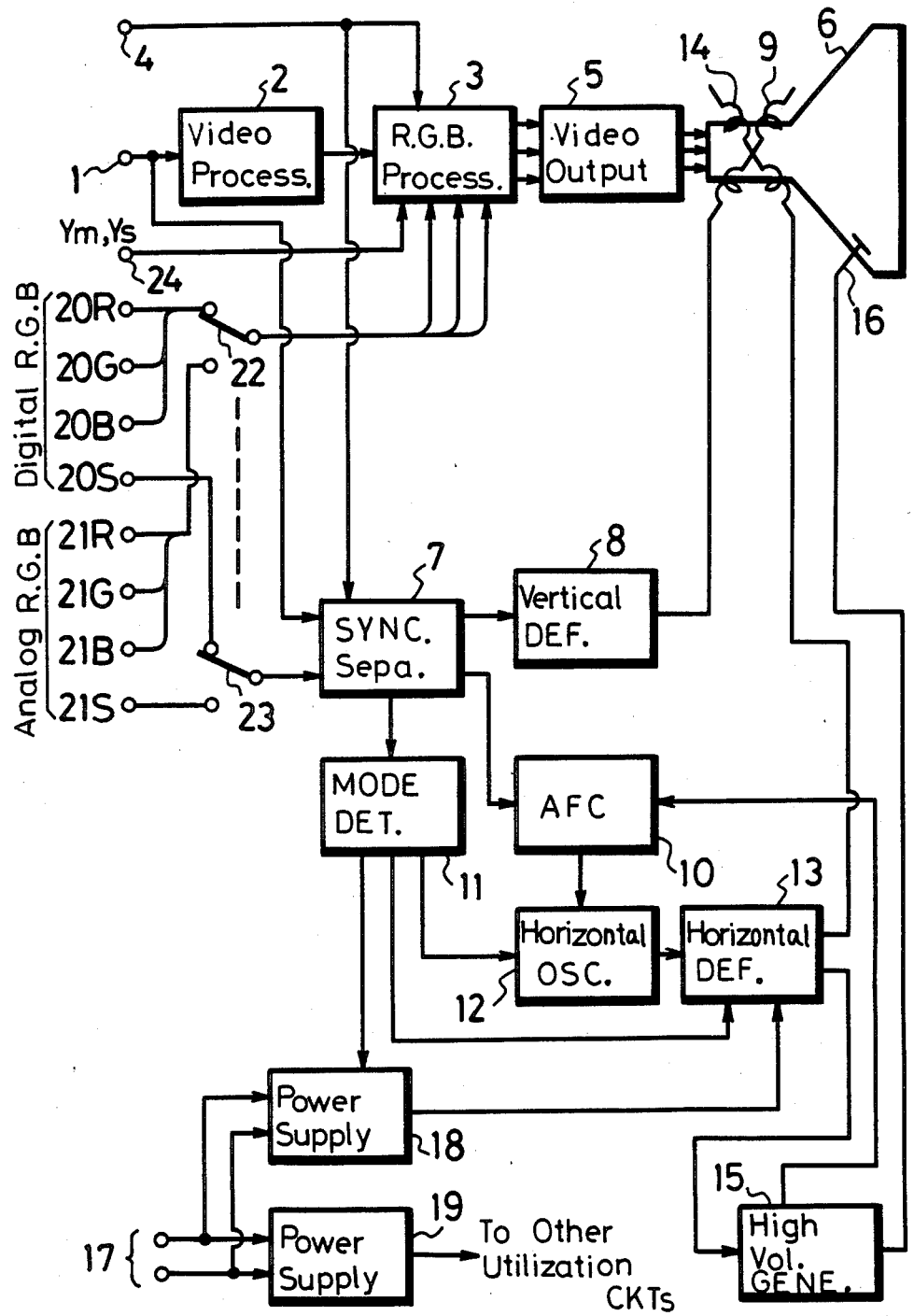
FIG. 1 is a block diagram showing a multiple scanning type television receiver previously proposed by the applicant same as that of this application.
Figure 2:
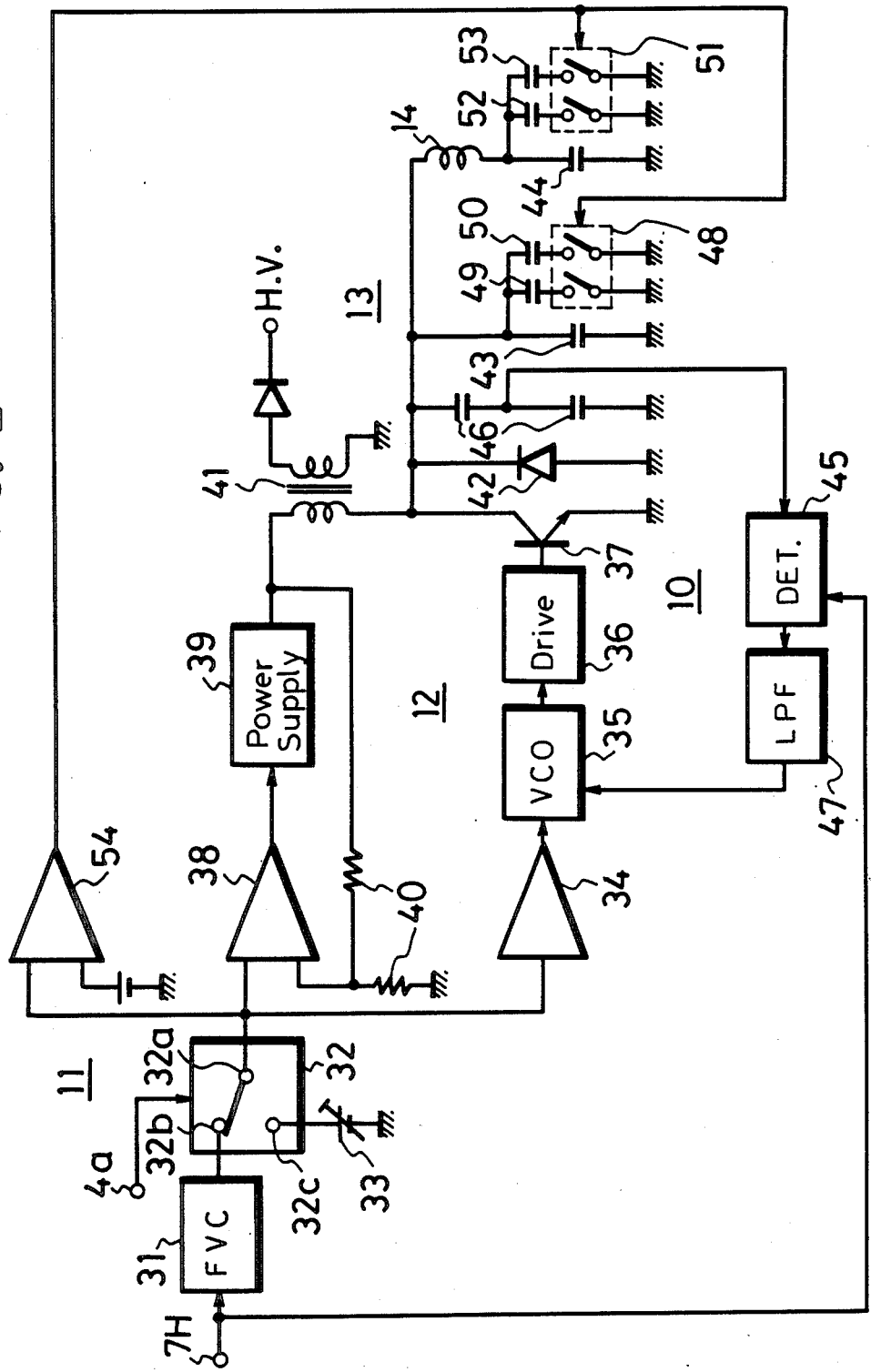
FIGS. 2 and 4 are circuit diagrams respectively showing a horizontal deflection stage of FIG. 1.
Figure 3:
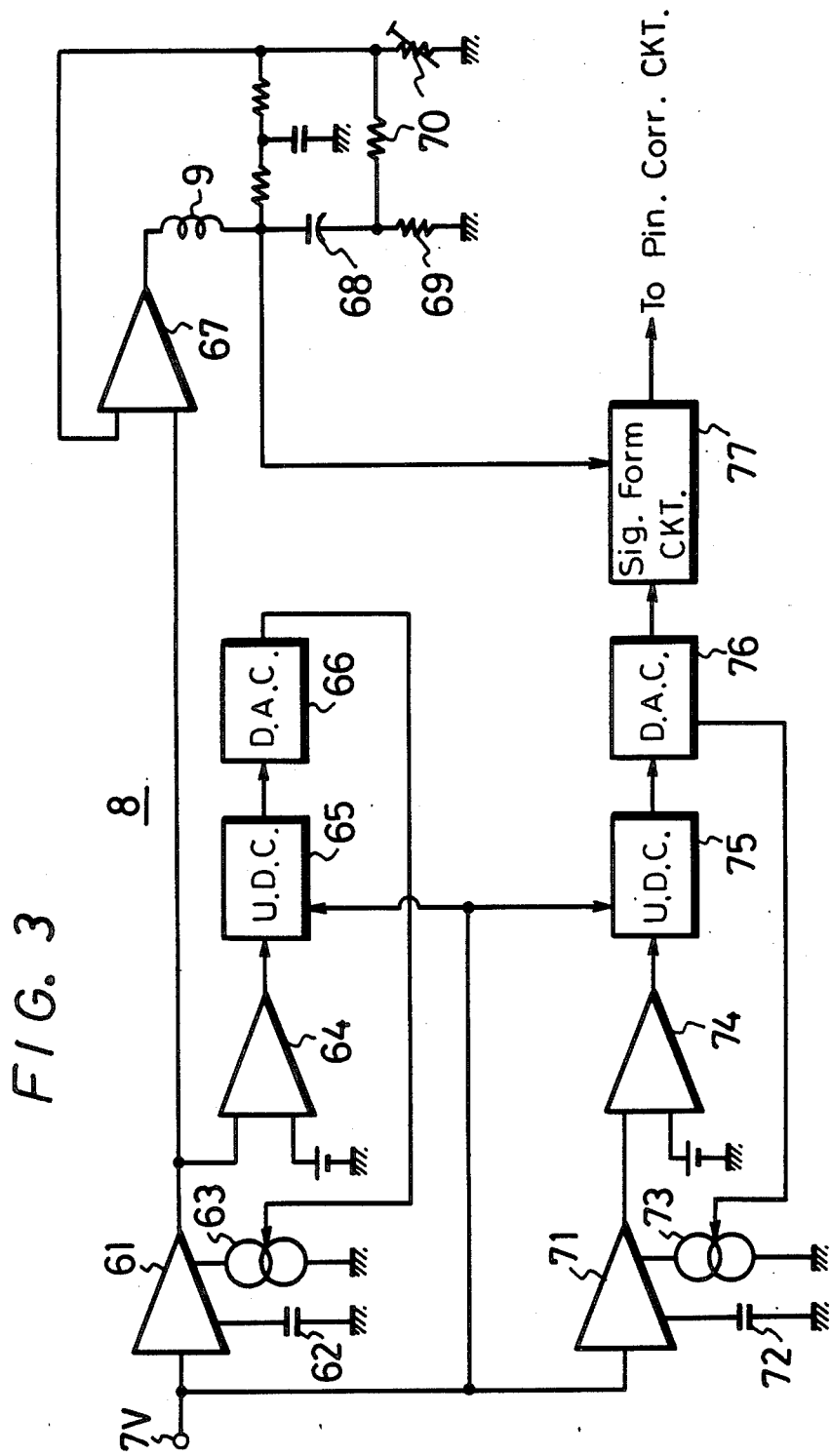
FIG. 3 is a circuit diagram showing a vertical deflection stage of FIG. 1.
Figure 4:
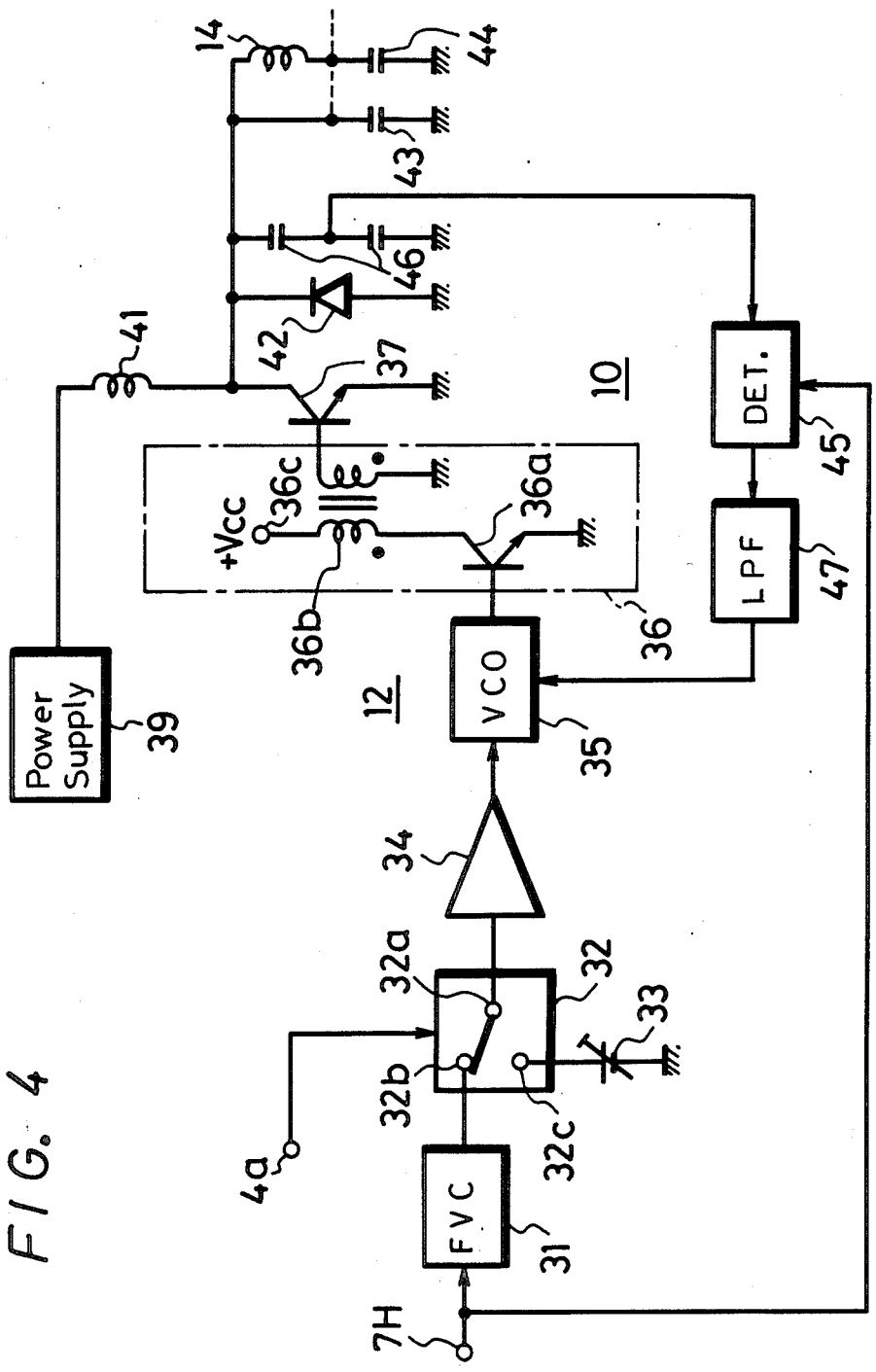
Figure 5A:
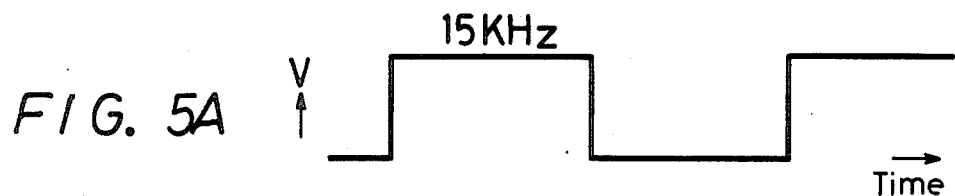
Figure 5B:
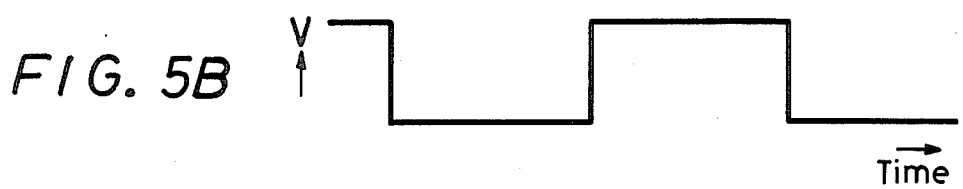
Figure 5C:
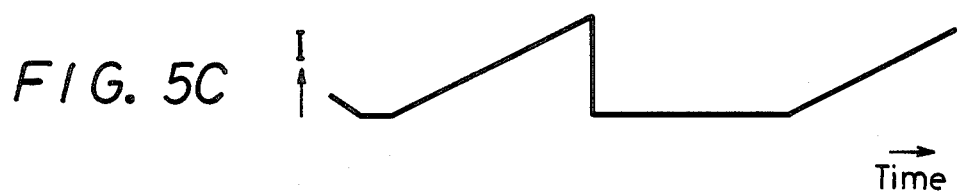
Figure 5D:
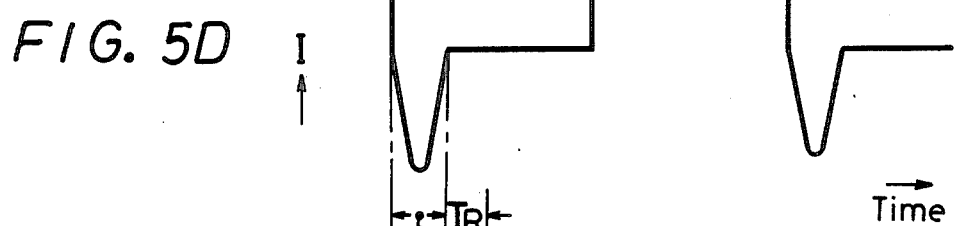
Figure 5E:
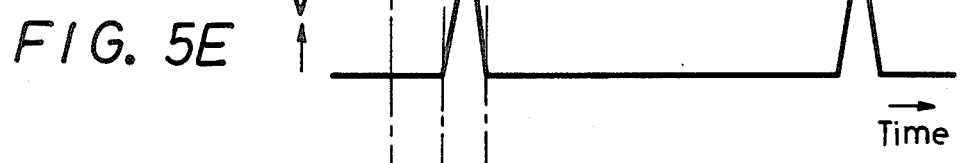
Figure 5F:
Figure 7:
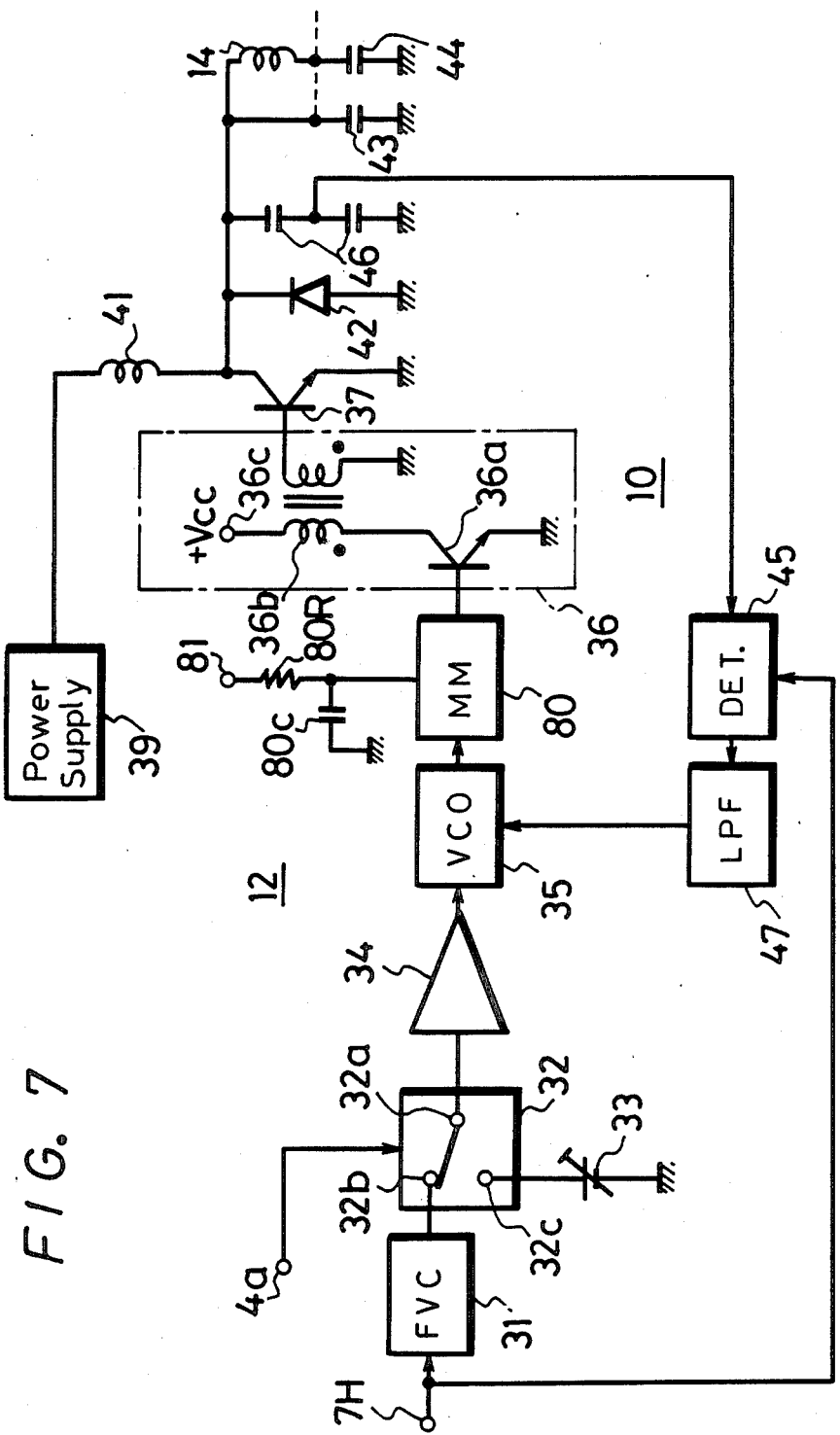
FIG. 7 is a circuit diagram showing one embodiment of a main portion of the present invention.
Figure 8A:
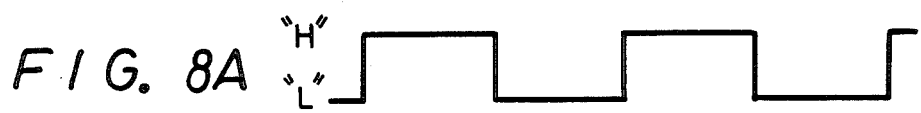
Figure 8B:
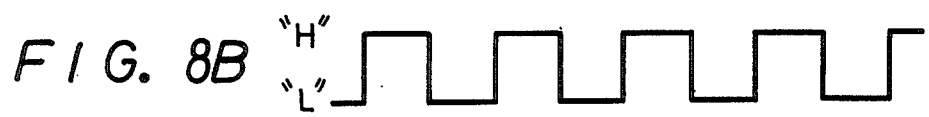
Figure 8C:
Figure 8D:

In this embodiment, as shown in FIG. 7, the horizontal drive pulse from the VCO 35 is supplied to a monostable multivibrator 80 and the output pulse from the monostable multivibrator 80 is supplied to the base of the horizontal drive transistor 36a of NPN type of the drive circuit 36. The emitter of the horizontal drive transistor 36a is grounded and the collector thereof is connected to the power supply terminal 36c via the primary winding of the horizontal drive transformer 36b. One end of the secondary winding of the horizontal drive transformer 36b is grounded and the other end thereof is connected to the base of the NPN type switching transistor 37. Reference numerals 80R and 80C respectively designate a resistor and a condenser which determine the time consant of the monostable multivibrator 80. The resistor 80R and the condenser 80C are used such that when the input pulses having frequencies of, for example, 15 KHz and 30 KHz as shown in FIGS. 8A and 8B are supplied, the monostable multivibrator 80 produce pulses the positive polarity periods of which are made constant and which have different duty cycles as shown in FIGS. 8C and 8D, respectively. The positive polarity periods of the above mentioned output pulses are designed to become longer than the sum of the storage time $T_S$ and the retrace time $T_R$ by a predetermined time period. Reference numeral 81 designates a terminal to which a positive DC power is supplied. Other circuit elements are formed similar to those of the multiple scanning type television receiver shown in FIGS. 1 to 3.

According to the above memtioned circuit arrangement, when the input video signal has the line frequency of, for example, 15 KHz, the horizontal drive pulse is supplied from the VCO 35 to the monostable multivibrator 80 and from the monostable multivibrator 80, a new horizontal drive pulse as shown in FIG. 9A is supplied to the base of the horizontal drive transistor 36a. Then, the collector voltage and current of this horizontal drive transistor 36a become as shown in FIGS. 9B and 9C, respectively. Further, the base current of the switching transistor 37 becomes as shown in FIG. 9D, while the collector voltage of the switching transistor 37 becomes as shown in FIG. 9E. As a result, the deflection current having a waveform as shown in FIG. 9F flows through the horizontal deflection yoke 14 so that the horizontal deflection is carried out in accordance with the line frequency of 15 KHz of the input video signal. At that time, since the duration of the positive polarity period of the new horizontal drive pulse from the monostable multivibrator 80 is longer than the sum period of the storage time $T_S$ and the retrace time $T_R$ by the predetermined time period, the time point Ta at which the base current of the switching transistor 37 begins to flow is placed after the end time Tb of the retrace pulse $P_R$ so that the base current can be prevented from flowing through the base of the switching transistor 37 during the retrace time period $T_R$.

When the line frequency of the input video signal is, for example, 30 KHz, the horizontal drive pulse is supplied from the VCO 35 to the monostable multivibrator 80 similarly as described above. From the monostable multivibrator 80, a new horizontal drive pulse having a duty cycle different from that provided when the line frequency is 15 KHz shown in FIG. 10A is supplied to the base of the horizontal drive transistor 36a so that the collector voltage and current of the horizontal drive transistor 36a become as shown in FIGS. 10B and 10C, respectively. The base current of the switching transistor 37 becomes as shown in FIG. 10D, while the collector voltage of the switching transistor 37 has a waveform as shown in FIG. 10E. As a result, the deflection current having a waveform as shown in FIG. 10F flows through the horizontal deflection yoke 14 to allow the horizontal deflection to be carried out in response to the line frequency of 30 KHz. At that time, since the duration of the positive polarity period of the new horizontal drive pulse from the monostable multivibrator 80 is longer than the duration of the sum of the storage time $T_S$ and the retrace time $T_R$ by the predetermined time period, similarly to the case of the input video signal having the line frequency of 15 KHz, the time point Ta at which the base current of the switching transistor 37 begins to flow is placed after the end time point Tb of the retrace pulse $P_R$ so that the base current can be prevented from flowing through the base of the switching transistor 37 during the retrace time period $T_R$.

As set forth above, according to this embodiment, in the multiple scanning type television receiver in which the line frequency of the input video signal is detected and then converted to the control voltage, this voltage is applied to the horizontal deflection circuit 13 and the line frequency of this horizontal deflection circuit 13 is switched, whereby the input video signals with different time frequencies are received and reproduced, the duty cycle of the horizontal drive pulse from the horizontal deflection circuit 13 is changed in response to the line frequency of the input video signal. That is, the duty cycle of the horizontal drive pulse is varied in response to the horizontal frequency so that the time period of the horizontal drive pulse in which the horizontal drive transistor 36a is turned on becomes longer than the duration of the sum of the storage time $T_S$ and the retrace time $T_R$. Thus, the television receiver of the invention has an advantage of capable of preventing the misoperation such as the base current flows through the base of the switching transistor 37 during the retrace time period $T_R$. Further, since the switching transistor 37 can be driven at optimum condition over a relatively wide range of the horizontal frequency, the heat loss can be reduced by a relatively large amount and the television receiver can be produced at low manufacturing cost and the freedom in the designing can be increased by so much.

Figure 11:
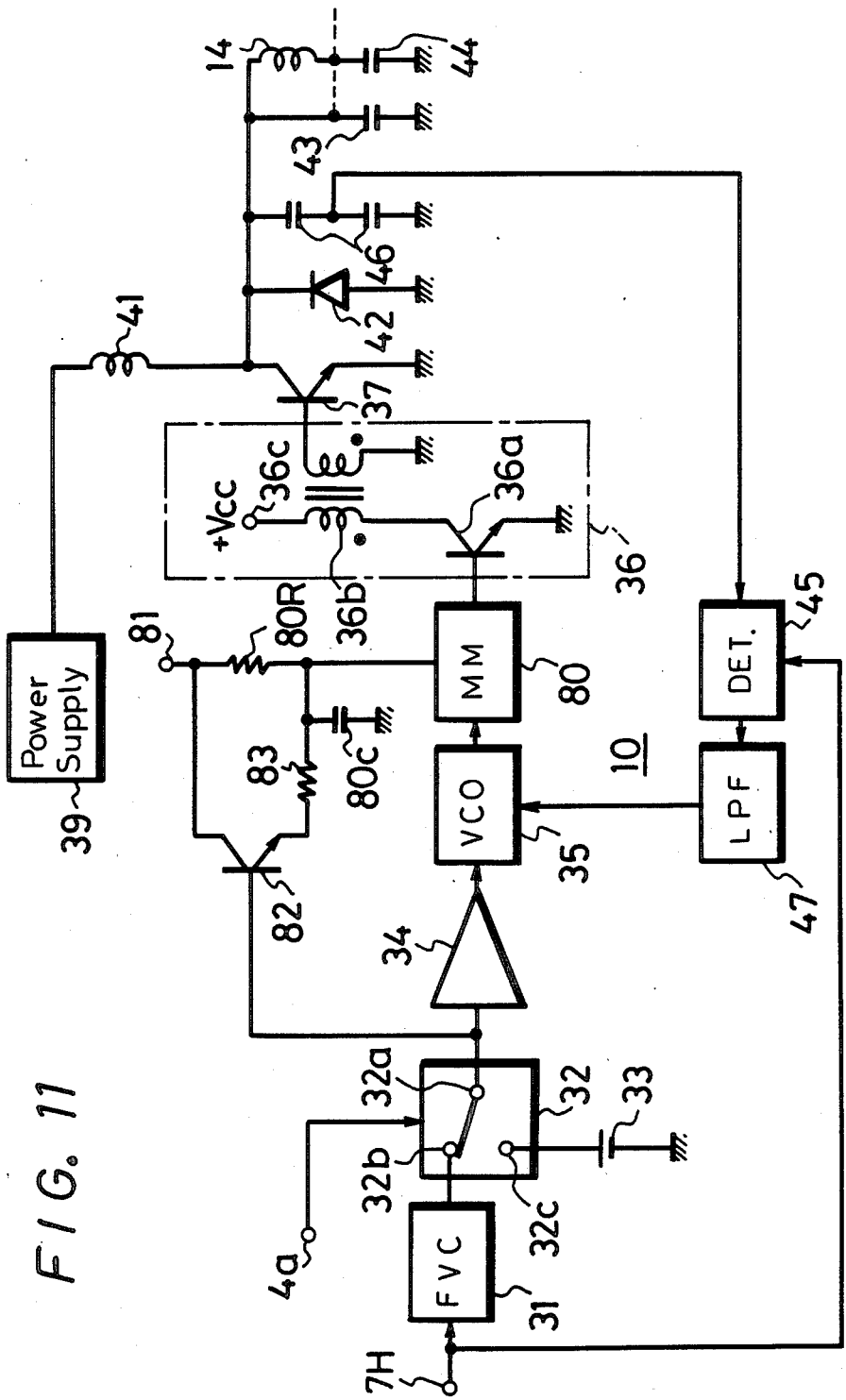
FIG. 11 is a circuit diagram showing another embodiment of the present invention.

FIGS. 11 and 12 show another embodiment of the multiple scanning type television receiver according to the present invention. In FIGS. 11 and 12, like parts corresponding to those of FIGS. 7 to 10 are marked with the same references and will not be described in detail.

In this embodiment, as shown in FIG. 11, a series circuit formed of a transitstor 82 and a resistor 83 is connected in parallel to the resistor 80R which determines the time constant of the monostable multivibrator 80 and the transistor 82 is controlled by the output voltage from the FVC 31, whereby the duty cycle and the positive period of the new horizontal drive pulse from the monostable multivibrator 80 are resepctively varied in proportion to and in inverse proportion to the horizontal or line frequency. In other words, the output voltage from the FVC 31 is supplied to the base of the NPN-type transistor 82, the power source terminal 81 is connected to the collector of this transistor 82 and the emitter of this transistor 82 is connected through the resistor 83 to the connection point between the resistor 80R and the condenser 80C. Similarly as in the above-mentioned embodiment, the positive period of the new horizontal drive pulse is selected to be longer than duration of the sum of the storage time $T_S$ and the retrace time $T_R$ by the predetermined time period.

Figure 12A:
FIGS. 12A–12F is a waveform diagram to be used for explaining the operation of FIG. 11.
Figure 12B:
Figure 12C:
Figure 12D:
Figure 12E:
Figure 12F:

According to the above-mentioned circuit arrangement, when the horizontal drive pulses as shown in FIGS. 12A, 12B and 12C are supplied from the FVC 35, the transistor 82 is controlled by the output voltage from the FVC 31, whereby new horizontal drive pulses of which the positive periods and the duty cycles are varied in response to the horizontal or line frequencies as shown in FIGS. 12D, 12E and 12F are respectively supplied from the monostable multivibrator 80 the time constant of which is changed in response to the line frequency to the horizontal drive transistor 36a and thereby the horizontal drive transistor 36a is driven. Then, the switching transistor 37 is driven by the horizontal drive transistor 36a through the horizontal drive transformer 36b similarly as in the above-mentioned embodiment.

Since in this embodiment, as the line or horizontal frequency becomes high, the positive period of the new horizontal drive pulse supplied from the monostable multivibrator 80 to the horizontal drive transistor 36a is made shorter, while the duty cycle of the horizontal drive pulse is made higher, even if the horizontal frequency is relatively high, the ratio between the charge and discharge of the energy of the horizontal drive transformer 36b during the on and off periods of the horizontal drive transistor 36a can fall in the predetermined range. As a result, when the ratio between the charge and discharge of the energy is one-sided extraordinarily and the line frequency is very low, it is possible to prevent the base current of the switching transistor 37 from being reduced too much or when the horizontal frequency is very high, it can be prevented that the base current of the switching transistor 37 is increased excessively, heat is generated and thus the heat loss is increased.

According to this embodiment it is possible to achieve the same action and effects as those of the above-mentioned embodiment shown in FIGS. 7 to 10. Further this embodiment has an advantage that the switching transistor 37 can be operated in optimum condition over a wide range of the horizontal frequency.

According to the multiple scanning type television receiver of the present invention, since the duty cycle of the horizontal drive pulse is varied in response to the line or horizontal frequency so that the time period in which the horizontal drive transistor is turned on by the horizontal drive pulse becomes longer than the duration of the sum of the time period of the storage time $T_S$ and the retrace time $T_R$, it is possible to prevent the troubles such as misoperation in which the base current flows through the base of the switching transistor during the retrace time period $T_R$. Further, since the switching transistor can be driven under optimum driving condition over a wide range of the horizontal frequency, there are advantages that the heat loss can be reduced relatively, the television receiver of the invention can be produced at lower cost by so much and the freedom in designing the television receiver can be increased.

The above description is given on the preferred embodiments of the invention but it will be apparent that many modifications and variations could be effected by one skilled in the art without departing from the spirits or scope of the novel concepts of the invention, so that the scope of the invention should be determined by the appended claims only.

We claim as our invention:

1. A television receiver comprising:
   video signal receiving means for receiving a video signal, a vertical synchronizing signal and a horizontal synchronizing signal;
   a signal processing circuit for supplying said video signal to a cathode ray tube;
   a vertical deflection circuit for supplying a vertical deflection signal to said cathode ray tube in response to said vertical synchronizing signal;
   a horizontal deflection circuit for supplying a horizontal deflection signal to said cathode ray tube in response to said horizontal synchronizing signal;
   frequency detecting means connected to said video signal receiving means for detecting the frequency of said horizontal synchronizing signal and deriving a control signal in response thereto; and
   control means connected between said frequency detecting means and said horizontal deflection circuit for controlling the latter in response to said control signal from the former;
   characterized in that said horizontal deflection circuit includes means for changing a duty cycle of a horizontal drive pulse such that the duty cycle increases when the horizontal frequency becomes higher.

2. A television receiver according to claim 1, wherein said means for changing the duty cycle of the horizontal drive pulse includes a monostable multivibrator having a predetermined time constant.

3. A television receiver according to claim 2, wherein said predetermined time constant is varied in response to said control signal such that the time constant becomes shorter when the horizontal frequency becomes higher.

4. A television receiver according to claim 1, wherein said video signal receiving means selectively receives standard and non-standard video signals.

5. A television receiver according to claim 4, wherein said frequency detecting means includes a switchable means for deriving a predetermined constant voltage as said control signal when said video signal receiving means receives said standard video signal.

6. A television receiver according to claim 4, wherein said video signal receiving means includes a first input terminal for receiving the standard video signal and a second input terminal for receiving the non-standard video signal.

7. A television receiver according to claim 6, wherein said standard video signal is in a form of a composite video signal and said non-standard video signal is in a form of R, G and B video signals.

8. A television receiver comprising:
   video signal receiving means for receiving a video signal, a vertical synchronizing signal and a horizontal synchronizing signal;
   a signal processing circuit for supplying said video signal to a cathode ray tube;
   a vertical deflection circuit for supplying a vertical deflection signal to said cathode ray tube in response to said vertical synchronizing signal;

a horizontal deflection circuit for supplying a horizontal deflection signal to said cathode ray tube in response to said horizontal synchronizing signal, said horizontal deflection circuit including an oscillator operated in synchronism with said horizontal synchronizing signal, a drive stage and an output switching device;

power supply means for supplying an operational voltage to said output switching device;

frequency detecting means connected to said video signal receiving means for detecting the frequency of said horizontal synchronizing signal and deriving a control signal in response thereto; and control means for supplying said control signal to said power supply means for increasing said operational voltage when the horizontal frequency becomes higher;

characterized in that said horizontal deflection circuit includes means for changing a duty cycle of a horizontal drive pulse from said drive stage such that the duty cycle increases when the horizontal frequency becomes higher.

9. A television receiver according to claim 8, wherein said means for changing the duty cycle includes a monostable multivibrator which forms a part of said drive stage and has a predetermined time constant.

10. A television receiver according to claim 9, wherein said predetermined time constant is changed in response to said control signal such that the time constant becomes shorter when the horizontal frequency becomes higher.

* * * * *